US005961208A

United States Patent [19]

Karpen

[11] Patent Number: 5,961,208

[45] **Date of Patent: *Oct. 5, 1999**

[54] COLOR CORRECTED HIGH INTENSITY DISCHARGE MOTOR VEHICLE HEADLIGHT

[76] Inventor: Daniel Nathan Karpen, 3 Harbor Hill Dr., Huntington, N.Y. 11743

[ * ] Notice: This patent is subject to a terminal disclaimer.

[21] Appl. No.: 09/020,145

[22] Filed: Feb. 6, 1998

Related U.S. Application Data

[63] Continuation-in-part of application No. 08/160,693, Dec. 1, 1993, abandoned.

[51] Int. Cl.$^{6}$ ...................................................... B60Q 1/04

[52] U.S. Cl. ........................... 362/510; 362/293; 313/112

[58] Field of Search .................................... 362/293, 263, 362/510, 255; 313/112

[56] References Cited

U.S. PATENT DOCUMENTS

| | | |
|---|---|---|
| 4,315,186 | 2/1982 | Hirano . |
| 4,920,459 | 4/1990 | Rothwell . |
| 5,045,748 | 9/1991 | Ahlgren . |
| 5,101,134 | 3/1992 | Rothwell . |
| 5,107,165 | 4/1992 | Dever . |
| 5,221,876 | 6/1993 | Bergman . |
| 5,239,230 | 8/1993 | Matthews . |
| 5,548,491 | 8/1996 | Karpen . |

FOREIGN PATENT DOCUMENTS

| | | |
|---|---|---|
| 762678 | 12/1956 | United Kingdom . |

OTHER PUBLICATIONS

David R. Lide, editor, Handbook of Chemistry and Physics; 73rd edition, CRC Press, Ann Arbor, MI 1992 p. 4–18, 4–77.

Weeks, Mary Elvira; Discovery of the Elements; Journal of Chemical Education; 6th edition; 1960 p. 552, p. 701, p. 704, 713–714.

Moeller, Therald; The Chemistry of the Lanthanides; Reinhold Publishing Co., New York, NY 1963 p. 1–4.

Hufner, S. "Optical Spectroscopy at Lanthanides in Crystalline Matrix" in Systematics and the Properties of the Lanthanides; edited by Shyama P. Sinha; 1983 ; 313, 373.

Weyl, Woldemar A; Coloured Glasses; Dawson's of Pall Mall; London, 1959 p. 219, 220, 77–78, 221, 226.

Weidert, F. Das Absorptions Spectrum Von Didymglasern bei verschiendenartiger Zusammensetzung des Grundglases; Zeithschritt f. Wissphotog; 1921–22 vol. 21 pp. 254–264.

Weyl, Wolderman A. and Evelyn Chostner Marboe; The Constitution of Glasses vol. 1, Interscience Publishers, a div. of John Wiley, NY, 1962, p. 315.

Bouma, P.J. "The Colour Reproduction of Incandescent Lamps and 'Philiphane Glass'"; Philips Technical Review; 1938, vol. 3, pp. 27–29.

Dannmeyer F., Das Neophanglas als nautisches Hilfsmittel bei unklarer Sicht, Die Glashutte; 1934, No. 4, pp. 49–50. (also including translation of above article).

(List continued on next page.)

*Primary Examiner*—Thomas M. Sember
*Attorney, Agent, or Firm*—Alfred M. Walker

[57] ABSTRACT

A high intensity discharge lamp, suitable for use as a headlight for land, rail, water, aircraft, and motor vehicles in particular. The lamp includes glass containing Neodymium Oxide, a rare earth compound. The Neodymium Oxide filters out the yellow light portion of the spectrum, thereby producing a color corrected light. Incorporation of yellow light in the light spectrum desaturates colors and reduces contrast. Improvement in contrast and a reduction in glare permits, for example, a motor vehicle driver to better discriminate the contrast of objects when there is no daylight and the only illumination is artificial. For drivers, in particular, elimination of the yellow light lessens eye strain currently resulting from light emitted by the conventional headlights of oncoming vehicles during hours of darkness.

26 Claims, 2 Drawing Sheets

OTHER PUBLICATIONS

Gouras, P. and E. Zrenner, "Color Vision", A review from a Neurophysicalogical Perspective; in progress in Sensory Physiology 1; Springer–Verlag, Berlin–Meidelberg, NY 1981 pp. 139–179.

Faye, Eleanor "A New Light Source" The New York Association for the Blind, Ny, NY undated, one page.

Cohen, Jay M. and Bruce Rosenthal, "An Evaluation of an Incandescent Neodymium Light Source on Near Point Performance of a Low Vision Population", Journal of Visual Rehabilitation, vol. 2, No. 4, 1988, pp. 15–21.

Disclosure Document No. 392,729, filed Feb. 9, 1996.

Ctyroky, V. Vber mid Nd2 03 and V2 03 gefarble Glaser. Glastechnischen Berichte, Jan. 1940, pp. 1–7.

Rosenhauer, M., Weidert, F., Ueber die spekrale Absorption von Neodymglasern, Glastechnische Berichte, Feb. 1938, pp. 51–57.

Jost, Kevin, "Anatomy of High–Intensity Discharge Headlamps" Automotive Engineering, Society of Automotive Engineers (SAE) Nov., 1995, pp. 38–42.

Shurcliff, William A., *Polarized Light Production and Use,* Harvard University Press, Cambridge, Massachusetts, 1962, pp. 129–133.

COLOR CORRECTED HIGH INTENSITY DISCHARGE MOTOR VEHICLE HEADLIGHT

This application is a continuation-in-part of application Ser. No. 08/160,693, filed Dec. 1, 1993, now abandoned.

FIELD OF THE INVENTION

The invention relates to the development of a new high intensity discharge motor vehicle headlight, and in particular a new headlight that will be capable of providing color corrected light that will be of improved color rendition and better contrast at the levels of illumination necessary to see while driving at night, and to eliminate much of the discomfort experienced by drivers seeing the headlights of cars coming in the opposite direction. It can be used on new cars and for older vehicles as a replacement item for the automotive after-market.

DOCUMENT DISCLOSURE PROGRAM

The application for patent is based on a disclosure filed on Feb. 9, 1996, as Disclosure Document No. 392,729, under the Document Disclosure Program.

BACKGROUND AND THEORY OF THE INVENTION

It has long been recognized that visual discomfort from the light from vehicles coming from the opposite direction is a major problem that has been unsolved up to this time.

One such proposed solution was to install polarizers on automotive headlights. The concepts behind such technology have been summarized by Shurcliff (Shurcliff, William A., *Polarized Light Production and Use,* Harvard University Press, Cambridge, Mass., 1962, pp. 129–133). To avoid the absorption of light that is inevitable in dichroic polarizers, a number of inventors have proposed using specially designed pile of plate polarizers in headlight systems (see for example, MARKS, British Patent No. 762,678)). Difficulties involving bulk, fragility, a tendency to become cloudy, polarization defect, and manufacturing costs, prevented the implementation of this technology.

The present invention extends the concept of a color corrected motor vehicle headlight from an incandescent sealed beam or tungsten halogen lamp, as disclosed in U.S. Pat. No. 5,548,491 (KARPEN, 1996) which is hereby incorporated by reference, to a high intensity discharge lamp.

In the last several years, high intensity discharge lamps have been installed on the new models of a number of luxury vehicles. A summary of these systems is included in the article "Anatomy of High Intensity Discharge Headlamps" published by the Society of Automotive Engineers (SAE) in Automotive Engineering in November, 1995, pp. 38–42.

Dever et. al. (U.S. Pat. No. 5,107,165, (1992)) discloses anode and cathode means are provided for a metal halide lamp which cooperate in providing more rapid light output during lamp start-up. A xenon-metal halide employing the improved discharge electrode means is disclosed along with an automotive headlamp having this lamp for its light source.

Rothwell et. al. (U.S. Pat. No. 5,101,134 (1992)), discloses a low wattage metal halide capsule shape having a cylindrical shape geometry with asymmetric regions behind the anode and cathode for direct current operation. The disclosure concerns several arc tube geometries to encourage internal convective flow in small, direct current arc discharge lamps.

Ahlgren et. al. (U.S. Pat. No. 5,045,748, (1991)) discloses flush and pump processes yielding light sources for incandescent and metal vapor discharge lamps. The flush and pump processes also yield lamps that are particularly suitable for deposition of a reflective coating on the outside surface. For such reflective coated light sources, the associated lamp leads are encased in glass and therefore are protected against any deleterious reactions that may otherwise result from the deposition of the reflective coating process. The light sources yielded by the flush and pump processes of the present invention are advantageous in reducing the mounting arrangements of the lamps in which the light sources are housed.

Rothwell et al. (U.S. Pat. No. 4,920,459, (1990)) discloses an arc discharge lamp system. An arc discharge headlamp system may be formed with a lamp housing including an enclosed reflector, a double ended arc discharge lamp having two leads at offset ends, enclosed in the reflector. A first lamp support for the front end of the lamp is coupled to the lamp housing, and a first lead connection for the lamp is coupled through a high potential conductor embedded in the lamp housing. The high potential conductor embedded in the lamp housing extends subsurface to a ballast cavity formed in the lamp housing and enclosing a ballast. The ballast is potted in the cavity to protect it. A second lamp lead extends through a second lamp support to the rear of the lamp housing to be connected to the ballast. The lamp capsule, high potential leads, and ballast are all securely enclosed as a single unit with potential leakage prevented between the elements and the outside.

Bergman et. al., (U.S. Pat. No. 5,221,876 (1993)) discloses a lamp containing a fill of xenon, mercury, and metal halide which is particularly suitable for automotive forward lighting applications. The xenon ingredient operates to provide for instant light necessary for automotive applications, whereas the mercury and metal halide ingredients operate to provide For a long life, high efficiency lamp relative to either a xenon or tungsten lamp. The dimensions of the xenon-metal halide lamp are approximately three-fifths (3/5) of those of a typical tungsten lamp utilized for automotive forward lighting applications. The reduced dimensioning of the xenon-metal halide lamp allows for correspondingly reduced dimensions of a related reflector for such a xenon-metal halide lamp which accommodates the needs of aerodynamically styled automobiles.

Matthews et. al. (U.S. Pat. No. 5,239,230 (1993)) discloses a high brightness discharge lamp which includes an arctube having an arc chamber formed therein and in which is disposed a fill of gas energizable to a discharge condition. At least two electrodes extend into the arc chamber and are separated by an arc gap of between 2 and 3.5 mm. The dose of mercury disposed in the arc chamber and various arc tube dimensions are selected so as to achieve a balance between three constraints including operating voltage thereby defining lamp efficacy, convective stability and structural integrity of the discharge lamp. A balance between arc gap, arc chamber diameter, wall thickness and the mercury density of the lamp yield a discharge lamp which achieves a light output on the order of 50,000 lumens per square centimeter.

Hirano et. al. (U.S. Pat. No. 4,315,186 (1982)) discloses a reflective lamp with a Neodymium Oxide doped front lens section fused to a reflective mirror section. However, Hirano restricts the amount of Neodymium Oxide in the front section to a range of 0.5 to 5.0 percent by weight. At an amount of Neodymium Oxide above 5 percent, the difference in the thermal expansion coefficient and the resultant glass material and that constituting the reflective mirror section and not containing Neodymium Oxide becomes too great, so that it becomes difficult to fuse the front lens section to the reflective mirror section. Also, the Hirano lamp is not a high intensity discharge lamp.

What the present invention does, and what the prior art failed to do, is to reduce the amount of yellow light emitted by the high intensity discharge headlight, since reducing the amount of yellow light in the spectrum improves color saturation and reduces glare. The approach of the present invention to the problem of visual discomfort and visual disability is to add Neodymium Oxide, a rare earth oxide, to the glass of the high intensity discharge lamp, to absorb the yellow light and reduce its presence in the spectrum of the lamp. The Neodymium Oxide can be added to the inner arc tube of the high intensity lamp, which is made of fused silica or fused quartz, in an amount up to about 3.0 by weight, or it can be added to the outer glass lens in an amount of 5.0 to to up to about 30 percent by weight.

The Insurance Institute For Highway Safety has letters in its files concerning glare from high intensity discharge lamps, even though at the time of the filing of this patent application, the absolute number of these vehicles on the road is very small, according to a verbal telephone conversation with Mike Cammisa, a staff member, on or about Jan. 26, 1998. As more vehicles are equipped with high intensity discharge lamps, or use them as daytime running lights, the glare problems are going to increase. In addition, Vivek Bhise, at Ford Motor Company, and Michael Perel at the National Highway Traffic Safety Administration, in telephone conversations with the inventor or or about Feb. 2–3, 1998, has both expressed concern about the glare from daytime running lights. As used herein and in the appended claims, the term "motor vehicle headlight" will also include lamps used for illumination at night and the daytime running lights on the front of a motor vehicle.

To explain the importance of the present invention, a discussion of its Neodymium Oxide component is as follows:

Neodymium is a rare earth element, having an atomic number of 60 and an atomic weight of 144.24. It combines with oxygen to form Neodymium Oxide, $Nd_2O_3$, having a molecular weight of 336.48.[1].

The elucidation of the rare earths in elemental form took the better part of the nineteenth century, and the properties of Neodymium that are important to the lighting art in this patent application were known even before Neodymium was prepared in metallic form. In 1803, Klaproth discovered the mineral ceria. It was also found about the same time by Berzelium and William Hisinger.[2] This mineral proved to be a mixture of various rare earth oxides. In 1814, Hisinger and Berzelius isolated Cerium Oxide from the ceria earth.[3] In 1839, Moslander found the rare earth lanthana in the ceria.[4] In 1841, Moslander treated lanthana with dilute nitric acid, and extracted from it a new rose colored oxide which he called didymium, because as he said, it seemed to be "an inseparable twin brother of lanthanum".[5]

It was believed that didymium was a mixture of elements. The separation proved difficult. In 1882, Professor Bobuslav Brauner at the University of Prague examined some of his didymium fractions with the spectroscope and found a group of absorption bands in the blue region ($\lambda$=449–443 nanometers) and another in the yellow ($\lambda$=590–568 nanometers).[6] In 1885, Welsbach separated didymium into two earths, praseodymia and neodymia.[7] The neodymia has the absorption bands in the yellow region. The neodymia earth is Neodymium Oxide.

The spectra of rare earths became of great interest to a number of investigators. The most impressive feature about the spectra of rare earth ions in ionic crystals is the sharpness of many lines in their absorption and emission spectra. As early as 1908, Becquerel realized that in many cases these lines can be as narrow as those commonly observed in the spectra of free atoms of free molecules.[8]

However, many solids that are of practical use today are amorphous or glassy rather than crystalline. That means that in the immediate environment of like ions in such substances is similar, but that there is no long range order in the sample. Rare earth ions can be easily incorporated into many glasses. It was noted quite early that in glasses, as might be expected, the most prominent feature of the rare earth crystal spectra, the extreme sharpness of the optical lines, vanishes.

From a simplified point of view, a glass is a supercooled liquid. It can therefore be assumed that the spectra of rare earth ions in glasses will be similar to those of rare earth ions in liquids. The spectra in liquid show a "crystal field splitting", although with very wide lines. This is an indication that the rare earth ions in a liquid are surrounded by a near neighbor shell of ligands—similar to the configuration found in a solid and the same for every rare earth ion, and that the uncorrelated structure is only beyond the near neighbor shell. If the near neighbor coordination in a liquid is the same as in a solid, one can understand the similarity in the magnitude of the crystal field splitting of the crystal and the solution. In glasses the rare earth ions are incorporated as oxides. From the reasoning just cited one can expect that rare earth spectra in glasses to be similar to those of the stable oxide modification of the particular rare earth ion; this expectation is verified by experimental findings.[9]

The absorption of an ion may undergo a fundamental change when placed in different surroundings. A great variety of colors which can be obtained with divalent copper, cobalt, or nickel ions have been attributed to the differences in co-ordination numbers and the nature of the surrounding atomic groups. The change of an ionic bond into a covalent bond produces a completely different absorption spectra. The close interdependence of light absorption and chemical change is not surprising when it is realized that the electrons which are responsible for the visible absorption are also responsible for the chemical interactions and the formation of compounds.

The case, however, is different with the rare-earth compounds. Their colors depend on the transitions taking place in an inner, well protected, electronic shell, whereas the chemical forces, as in other elements, are restricted to deformations and exchanges of electrons within the outer electronic shells. Consequently, the color of Neodymium compounds remains practically independent of the nature of the atoms in which the element is linked. The hydrated salts are amethyst colored, just as the water free salts, the ammoniates, the hydroxide, or the oxide. Chemical changes affect color only to a minor extent.[10]

A number of studies of Neodymium Oxide containing glasses have been conducted to examine the absorption spectra. Weidert conducted a systematic study in 1922. Samples of pure Neodymium Oxide glasses were made available for the first time, relatively free of contamination from impurities such as praeseodymium.[11] Spectra were published showing the absorption of yellow light in a broad band from 568 to 590 nanometers.[12]

According to Rosenhauer and Weidert, the absorption spectra of the $Nd^{+3}$ ion in glasses signals any change of the structure which affects the stability of the glassy state.

Composition changes which increase the tendency of a glass to devitrify also blur the normally sharp absorption bands of the $Nd^{+3}$ ions. The absorption indicators can be used therefore for studying the compatibility of oxide systems.[13] In their studies, the base glasses differed in their alkalis. The smaller the atomic radius of the alkali the more diffuse is the absorption band. The fine structure of the rubidium glass gradually disappears when this large alkali is replaced by the smaller potassium, sodium, or lithium ion. The corresponding lithium glass could be obtained only by rapid cooling; otherwise crystallization took place. Thus, there seems to be a general connection between the tendency of a glass to devitrify and its absorption spectrum. In all the glasses which crystallize readily Neodymium causes only a somewhat diffuse absorption spectrum.[14] Regardless of the alkali base of the underlying glass, the absorption of yellow light between 568 and 590 nanometers is seen in all samples of glass (see FIG. 1).[15]

Glasses containing Neodymium Oxide experience "dichroism". In artificial light, the Neodymium Oxide glass appears as a brilliant red. The color sensation not only varies with the type of illumination, but also with the thickness of the glass layer. In thin layers or with low concentrations of Neodymium Oxide these glasses are blue, in thick layers or with high concentrations, red.[16]

V. Ctyroky made a study of the dichroism of glasses containing various combinations of Neodymium and Vanadium. It was his attempt to calculate the thickness of the glass and the concentration of the colorants which product the maximum dichroism. The color play of these glasses is caused by the Neodymium Oxide, for the Vanadium Oxide produces a green color which serves only to modify the original blue-red dichroism of the rare earth. The absorption of the yellow light between 568 and 590 nanometers is so intense that even a faintly colored Neodymium Oxide glass absorbs yellow light almost completely. Thus the transmitted spectrum is divided into two parts, a blue and a red one. The color sensation which such a glass produces depends on the intensity distribution of the light source. In daylight the blue part predominates; in artificial light (incandescent), which is relatively poor in short-wave radiation, the red predominates.[17]

The characteristic absorption of a Neodymium Oxide glass, especially its narrow intense band in the yellow part of the spectrum, affects color vision in a unique way. Looking through such a glass at a landscape or a garden in bloom, the red and green hues are strongly accentuated; especially do all colors containing red stand out very clearly.[18] This improvement is very important at the low levels of illumination provided at great distances by a motor vehicle headlight. For example, a red stop sign will appear redder.

Another interesting feature when looking through a Neodymium Oxide glass is the distinction between the green of vegetation and a similar green hue produced by the blending of inorganic pigments. Whereas the hues of both greens may be the same, the reflection spectra are fundamentally different in respect of their intensity distribution; for the chlorophyll of plants possesses a spectrum rich in fine structure.[19] Such an effect is very important for vision along highways, where most of the road signs along Interstate or similar class roads are green. Thus, during the growing season, motorists would find it easier to see road signs at greater distances against green vegetation.

Bouma explains how the electric light (incandescent lamp) can be improved by the introduction of a colored envelope using a glass with Neodymium Oxide, known as "Neophane" glass (for purposes of clarity, an envelope refers to the outer shell of a lamp bulb). It is clear that large portions of the spectrum must not be weakened to any extent. Otherwise, there would be too great a decrease in the efficiency. Only an improvement of the color which can be obtained with a relatively slight loss of light can be considered.[20]

The only possibility thus consists of the absorption of one or more relatively small regions of the spectrum. The pertinent question is what colors may be considered in this connection? In general, absorption of a given color is accompanied by the following two objections:

1. An object which reflects almost exclusively this color appears too dark.
2. Objects which exhibit the color under consideration in a less saturated form will appear still less saturated.

The first objection holds primarily for the colors at the extremities of the spectrum, thus for red and blue. Very saturated red, for example, can only occur when a material reflects practically exclusively red and orange. The same is true of blue.

For yellow, the situation is different. Highly saturated yellow occurs in nature as a rule, not only because a narrow region of the spectrum is reflected, but because red and green as well as yellow are fairly well reflected, and only blue and violet are absorbed to a large extent.

The second objection also holds particularly at the extremities of the spectrum: the blue, which is reproduced in electric light is a much less saturated form than in daylight, may certainly not be made still duller. The saturation of the red may also not be decreased too much, since otherwise the reproduction of skin color would be made worse.

For the reasons mentioned above, the second objection is also of much less importance in the case of yellow.

Bouma surrounded an incandescent lamp with a bulb of the Neodymium Oxide containing Neophane glass, and compared the color rendition to an incandescent lamp surrounded by an ordinary opal glass bulb. His results indicated the majority of the colors became more saturated, a change which is to be desired, especially at relatively low levels of illumination. In particular, the blue, which upon changing from daylight to incandescent has become considerably less saturated is again reproduced in a more saturated form.

The orange is shifted toward the red: the shift in the direction yellow to red is in general experienced as an increased "warmth" of that color.

The green, which upon translation from daylight to incandescent light had become a somewhat dubious yellow-green, goes back to green again under the influence of the Neophane glass.

Finally, Bouma notes that white and the very unsaturated colors are shifted in the direction of blue-violet. This may certainly not be considered an advantage since however the change is not very great, and moreover since it lies almost in the same direction as the shift on transition from daylight to incandescent light, the shift is not disturbing.[21]

In summary, Bouma found that the use of the Neodymium Oxide containing Neophane glass has the advantage of reproducing most colors in a more saturated form and of making the orange-yellow warmer. Various disadvantages of incandescent light, such as the faded appearance of blue and the shift of green towards yellow-green, are partially overcome. The most important advantages of the incandescent light such as the high saturation of the orange and of the colors in its neighborhood, the greater intensity of red, are retained.

Dannmeyer made an investigation of Neodymium Oxide containing Neophane glass as a vision aide in bad weather for navigational purposes.[22] His experiences parallel those of a motorist on a foggy or rainy night. If one looks at a spectrum through this glass, one will notice that yellow is eliminated, but red and green appear much clearer. If one looks at a landscape, even in murky weather, one will see wonderful lustrous colors, emphasizing everything red and even green. But there is another special effect: the discomforting blinding effect created principally by yellow disappears at the same time. If one looks at the branches of a bare tree against a bright sky, one won't be able to see the ends. They disappear in the general glaze. If, however, one looks through the Neodymium Oxide glass—or as it is now technically called, Neophane glass—even the slightest differences are emphasized. All blinding effects against the clear sky or the sun, disappear and the elements of the optical picture appear more sharply even when looking toward the sunset and twilight pictures have more contrast.

As further noted in Dannmeyer,[23] the effects of using the Neodymium Oxide containing Neophane glass was studied during the summer and fall on the Elbe River and in the North and Baltic Seas. It was shown that clear sighting made red and green as already mentioned, especially clear. External identification of a ship by the color of its smoke stack, bottom paint, ensign and other elements was made much easier. If the weather was hazy or misty, so that one could see the other ship only as a silhouette grey against grey, color differences could still be seen that could not have been recognized with unaided sight. But what was immensely important was that ships that in hazy weather seemed to be the same distance apart, were seen to be at varied distances from one another; both location and movement were much easier to differentiate.

It is well known that on the Elbe, at sunset, outgoing ships looking into the sunset have on occasion had optical difficulties caused by the blinding of the sun. Markers are difficult to distinguish, and even though ship pilots are exceedingly well informed, discerning an oncoming ship is sometimes exceedingly difficult.

According to Dannmeyer, Neodymium oxide containing Neophane glass prevents all of these things from happening to the eye. Along the lower Elbe one is able to distinguish a lengthening of the coastline even in hazy weather, and thus seeing distances are actually extended by about a nautical mile. On the North Sea, it is possible to make out various vessels that would not have been discernible in the misty weather. The grey of the vessels appears darker than the surroundings through the eyeglasses. In the reflection of the sinking sun, in which the eye really could not distinguish objects, the vessels were clearly discernible through the Neodymium Oxide containing Neophane glass.[23]

The aforementioned studies of Neodymium oxide containing glass in window and indoor light bulb applications can be applied to the previously undiscovered use of the present invention for vehicular headlights, for better vision during night driving.

According to the present invention, when the Neodymium Oxide glass is used in a motor vehicle headlight for night and bad weather driving, the discomforting undesirable yellow light is filtered out, making objects more clear with improved contrast and color rendition. In addition, the eyestrain caused by the intense point sources of on-coming individual headlights coming from the opposite direction, is eliminated, ending once and for all the discomfort experienced from light from headlights coming from the opposite direction.

A physiological explanation of how the eye sees colors provides an explanation of the visual effectiveness of Neodymium Oxide lamps for vehicular headlights. The following explanation is provided by Gouras:[24]

There are three cone mechanisms in the human visual system, with peak sensitivities near 440 nanometers in the blue-violet, 540 nanometers in the green, and 610 nanometers in the orange. These mechanisms are loosely called "blue", "green" and "red" processes in vision because they may be roughly thought of as being affected, respectively, by blue, green, and red light.

There are approximately 6 to 7 million green plus red cones per eye, and less than 1 million blue cones. The green and red cones contribute towards seeing fine detail and contrasts; the blue cones do not. The blue cones are thought to provide, mainly, the means of distinguishing between yellow and white appearing objects; the blue-cone mechanism is excited by blue light and inhibited by yellow light.

When mid-spectral (yellowish) images are in sharp focus on the retina, bluish wavelengths are out of focus. Low visual acuity is associated with the blue-cone mechanism, and high visual acuity with the green plus red cone mechanism. The term "yellowish images" does not necessarily imply any yellow content in the light, since green plus red yields the sensation of yellow.

The cones feed their signals into various kinds of cells in and beyond the retina. Strongly cone opponent cells are those cells that are excited by one color of light and inhibited by another. The "red-green contrast detectors" contribute heavily to both luminance and color contract, and also to the detection of differences between elements of a scene. They supply information on fine spatial detail.

The strongly cone-opponent cells (associated with the green and red cones) are turned off or on by green or red light, and are very unresponsive to yellow light. The red-green contrast detector is totally inhibited by yellow light.[25]

Thus, a vehicular headlight with Neodymium Oxide containing glass appears to provide the maximal filtering effect of the discomforting yellow light in order to improve contrast, visual acuity and color recognition.

Two recent studies of the functioning of the eye for people of low vision are of interest. Neodymium Oxide type motor vehicle headlights will be of help not only to people who have normal vision, but also to people who may be visually impaired.

Faye reports that the visual impression in viewing colored objects is a vivid "true" color similar to the view in full sunlight.[26] In viewing high contrast acuity charts, contrast sensitivity chart tests (Vistech VCTS 6500), and reading material, there is an increased contrast between black and white, when incandescent light bulbs containing Neodymium Oxide are used indoors. White appears whiter and black blacker because of the decreased yellow emission of the Neodymium Oxide containing bulb.

To date, while no specific recommendations can be made, it appears that a history from visual impaired patients that they need sunlight for best reading (or can't read by artificial light), indicates a favorable response to the Neodymium Oxide containing light bulbs. Favorable responses have been elicited from patients with retinitis pigmentosa, optic atrophy, glaucoma with visual field defects, and diabetes with proliferative retinopathy who have undergone panretinal photocoagulation.

A study of low vision patients was conducted by Cohen and Rosenthal at the State University of New York School of Optometry in New York City.[27] Their study also found more accurate color rendering and an improvement in visual acuity, contrast, and a reduction of eye fatigue. Tests were conducted on 51 low vision patients using standard incandescent lamps and standard "A" type Neodymium Oxide lamps on the Vistech 6000 Contrast Test and high and low contrast acuity cards. Results showed a small, but statistically significant performance on all targets when using Neodymium Oxide bulbs. Subjective preference also favored the Neodymium Oxide bulbs in a 5 to 1 ratio when a preference was present. The patient population had such pathologies such as achromotopsia, albinism, cataracts, congenital cataracts with aphakia, cortical anoxia, diabetic retinopathy, optic atrophy, pathological myopia, primary nystagmus, retinitis pigmentosa, ROP, and SMD.

As a result, it is shown that the use of Neodymium Oxide as a doping agent in the glass of a light source will filter out yellow light, thus favoring vision promoting red-green contrast detectors, to improve visual contrast, visual acuity, and better color recognition.

REFERENCES

1. David R. Lide, editor; *Handbook of Chemistry and Physics;* 73rd edition; CRC Press; Ann Arbor, Mich.; 1992. p. 4-18, 4-77.
2. Weeks, Mary Elvira; *Discovery of the Elements;* Journal of Chemical Education; 6th Edition; 1960; p. 552.
3. Moeller, Therald; *The Chemistry of the Lanthanides;* Reinhold Publishing Company; New York, N.Y.; 1963; pp. 1–4.
4. Weeks; p. 701.
5. Ibid., p. 704.
6. Ibid., p. 713.
7. Ibid., p. 714.
8. Hufner, S.; "Optical Spectroscopy of Lanthanides in Crystalline Matrix"; in *Systematics and the Properties of the Lanthanides;* edited by Shyama P. Sinha; 1983; p. 313.
9. Ibid., p. 372.
10. Weyl, Woldemar A.; *Coloured Glasses;* Dawson's of Pall Mall; London; 1959; p. 220.
11. Ibid., p. 219.
12. Weidert, F.; "Das Absorptionsspektrum von Didymglasern bei verschiendenartiger Zusammensetzung des Grundglases"; Zeithschrift f. wiss. Photog.; 1921–22; Vol. 21; pp. 254–264.
13. Weyl, Woldemar A., and Evelyn Chostner Marboe; *The Constitution of Glasses,* Vol. 1; Interscience Publishers, a division of John Wiley & Sons; New York, N.Y.; 1962; p. 315.
14. Weyl, Coloured Glasses, p. 77.
15. Ibid., P. 78.
16. Ibid., P. 221.
17. Ibid., P. 221–222.
18. Ibid., P. 226
19. Ibid.
20. Bouma, P. J.; The Colour Reproduction of Incandescent Lamps and "Philiphane Glass"; Philips Technical Review; 1938; Vol. 3; pp. 27–29.
21. Ibid.
22. Dannmeyer, F.; "Das Neophanglas als nautisches Hilfsmittel bei unklarer Sicht"; Die Glashutte; 1934; Number 4; pp. 49–50.
23. Ibid.
24. Gouras, P. and E. Zrenner; "Color Vision: A Review from a Neurophysiological Perspective"; in *Progress in Sensory Physiology* 1; Springer-Verlag, Berlin-Heidelberg-New York, 1981, pp 139–179.
25. Ibid.
26. Faye, Eleanor; "A New Light Source"; The New York Association for the Blind; New York, N.Y.; undated; one page.
27. Cohen, Jay M. and Bruce P. Rosenthal; "An Evaluation of an Incandescent Neodymium Light Source on Near Point Performance of a Low Light Vision Population"; Journal of Visual Rehabilitation; Vol. 2, No. 4; 1988; pp. 15–21.

SUMMARY OF THE INVENTION

While the present invention relates to all kinds of headlights for land and water vehicles, a vast improvement in visual performance, color rendition, and contrast of objects being illuminated is achieved by, for example, a high intensity discharge motor vehicle headlight containing Neodymium Oxide in the glass of the high intensity discharge headlight.

The transmittance of light through glass is governed by the Lambert-Beers Law, which relates the amount of light transmitted through a certain thickness of glass by an absorption coefficient:

$$Ln(T)=-AL$$

In the above equation, L is the thickness of the glass, A is the absorption coefficient, T is the percentage of light transmitted, and Ln represents the natural logarithm.

For the purpose of manufacturing Neodymium Oxide containing classes, the Neodymium Oxide must be reasonably pure. Impurities can reduce transmittance of light other than yellow, which is absorbed by the Neodymium Oxide.

The use of Neodymium Oxide as an ingredient in glass making, especially for the production of millions, if not tens of millions of lamps annually, requires a substantial amount of Neodymium Oxide of purity of 96.0 to 99.0 percent. The absorption properties of Neodymium Oxide containing glasses were known prior to World War II. However, the cost of producing reasonably pure Neodymium Oxide was quite high, because the chemical properties of the lanthanides are similar, and separation is difficult.

During World War II, while working on the separation of the fission products as part of the atomic bomb project, scientists developed the elution chromagraphic ion exchange method for separating the rare earth elements. A major breakthrough occurred in the 1950's when Frank H. Spedding and co-workers developed the band-displacement ion exchange method, which was capable of producing macro quantities of extremely pure individual elements. Within 10 years, liquid-liquid extraction methods were developed which provided even lower priced individual rare earth elements.

Thus, it is possible to manufacture Neodymium Oxide containing high intensity discharge headlight lamps at a reasonable cost, that does not add significantly to the price of a new air, water, rail, or landcraft, or in particular an automobile, and the high intensity discharge lamps can be reasonably priced to compete in the vehicle aftermarket.

Neodymium Oxide containing glasses are commercially available for use in glass blowing. An example of a glass that is available that may be used for the purposes of the vehicular headlight of the present invention is described below. It is a mixed alkali zinc silicate crown glass that can be used for the outer bulb envelope, L6660, manufactured by Schott Glass Technologies of Duryea, Pa. 18642. It has 4.0 percent Neodymium Oxide doping with an extinction of 8.1 $cm^{-1}$ at 585 nanometers In the inner arc tube, which is made of fused silica or fused quartz, a maximum amount of 3.0 percent by weight of Neodymium oxide can be incorporated into the fused silica or fused quartz.

DESCRIPTION OF THE DRAWINGS

The invention can be best understood with reference to the following drawings in which.

DETAILED DESCRIPTION OF THE DRAWINGS

Figure 1:
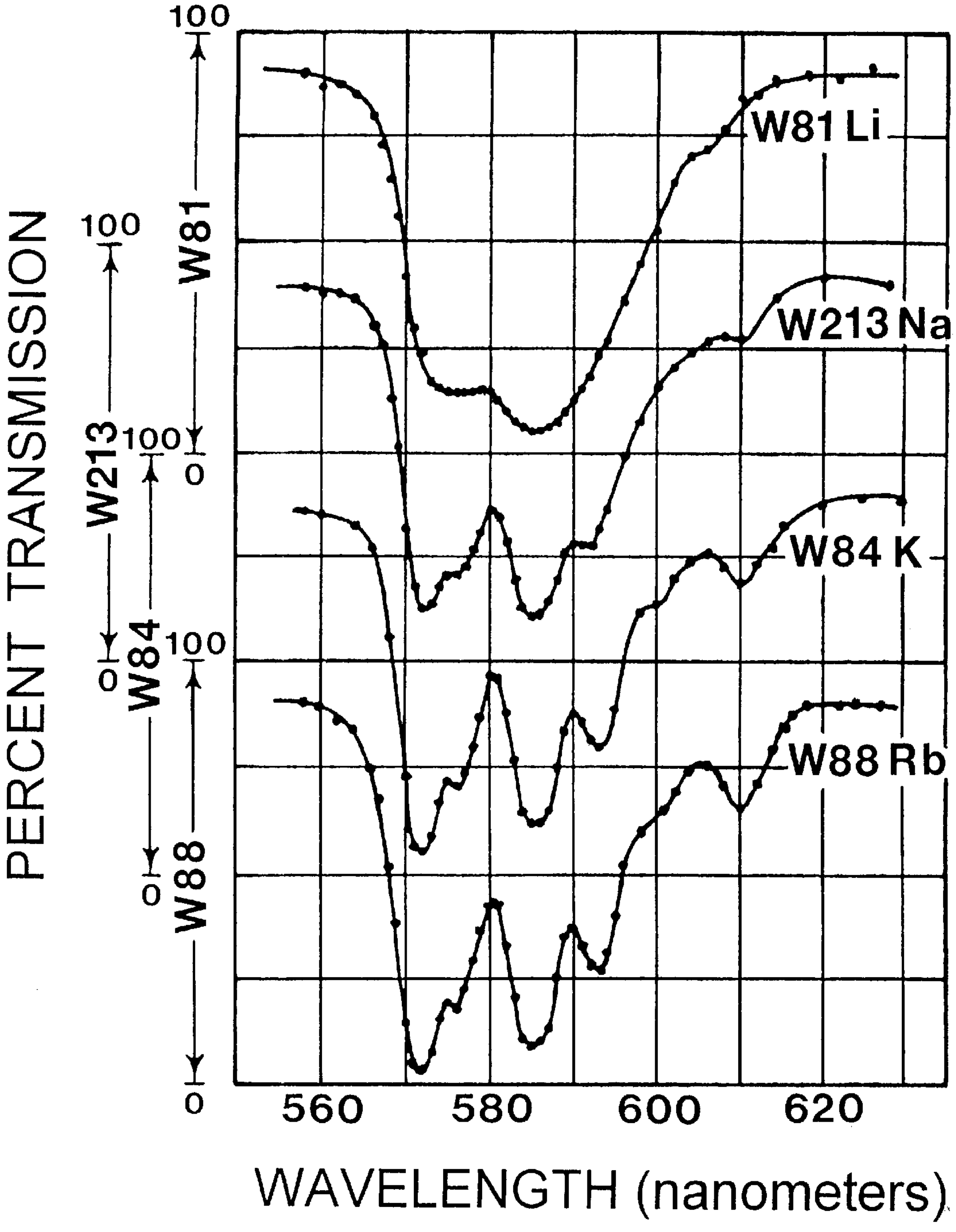
FIG. 1 is a graph comparing the transmittance of a number of Neodymium Oxide containing glasses.

FIG. 1 shows the transmission of various glasses containing Neodymium Oxide. It is shown that the smaller the atomic radius of the alkali the more diffuse is the absorption band. The fine structure of the rubidium glass gradually disappears when this large alkali is replaced by the smaller potassium, sodium, or lithium ion. The importance for the invention at hand is that regardless of the base type of the glass, the absorption of yellow light between 568 and 590 nanometers is seen in all samples of glass. It is seen that the W87 lithium base Neodymium Oxide glass is absorbing 95% of the yellow light at 585 nanometers.

Figure 2:
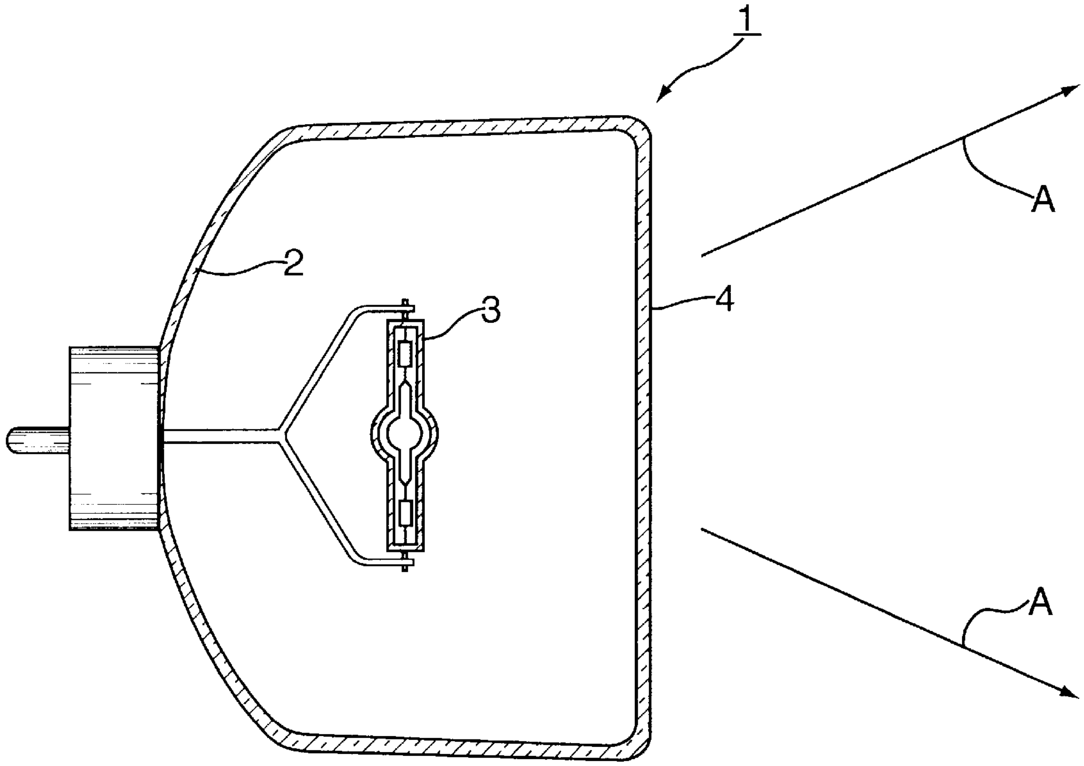
FIG. 2 is a sectional view of a high intensity discharge motor vehicle headlight containing Neodymium Oxide in the inner arc tube of the present invention.

FIG. 2 is a sectional view of a high intensity discharge motor vehicle headlight containing Neodymium Oxide in the inner arc tube of the present invention.

Figure 3:
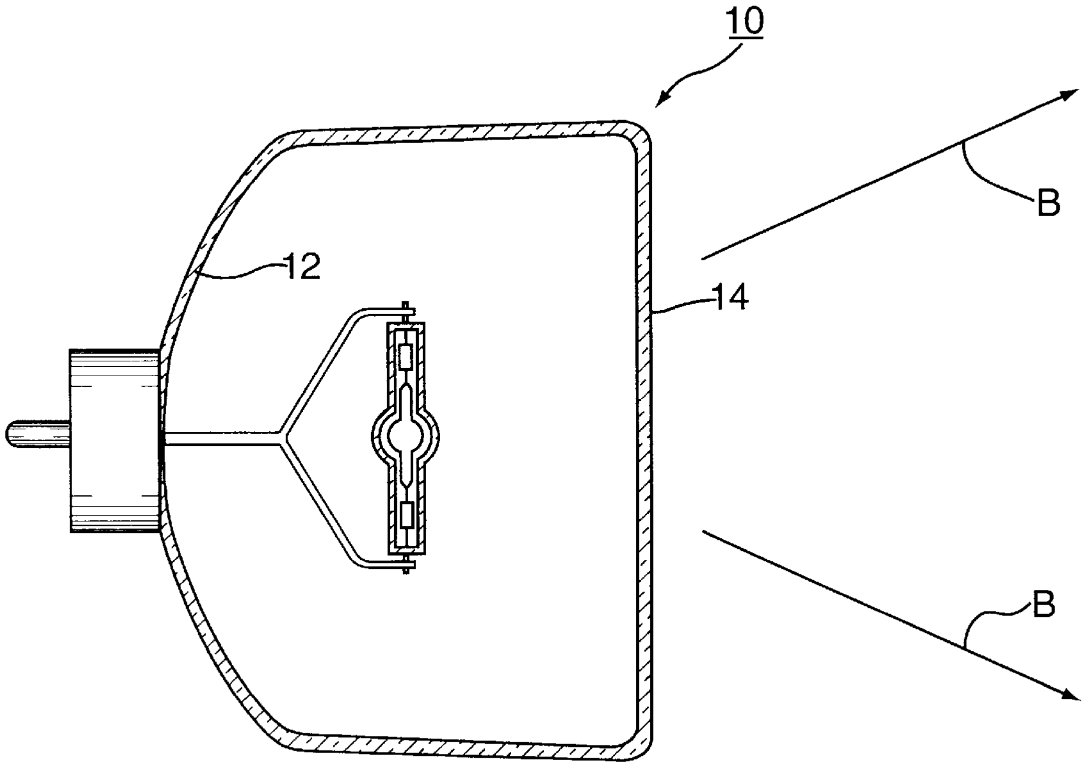
FIG. 3 is a sectional view of a high intensity discharge motor vehicle headlight containing Neodymium Oxide in the outer lens envelope of the present invention.

FIG. 3 is a sectional view of a high intensity discharge motor vehicle headlight containing Neodymium Oxide in the outer lens envelope of the present invention.

DETAILED DESCRIPTION OF THE PREFERRED EMBODIMENT

The present invention constitutes a lamp for artificial illumination, including a means for illumination and the lamp has an inner arc tube and an outer lens envelope of a suitable glass material, wherein either the inner arc tube or the outer lens envelope contains the element Neodymium, in the form of the rare earth compound Neodymium Oxide.

As shown in FIG. 2, a high intensity discharge headlight 1 has a generally concave inner reflector 2 which directs light from a fused silica or fused quartz inner arc tube through the generally transparent outer glass envelope 4 in an outwardly expanding conical light beam A, which is transmitted from the vehicle headlight 1 and reflected off of objects at night and in bad weather, back to the motor vehicle driver, with improved visual contrast from a substantial reduction in the amount of yellow light, by the addition of Neodymium Oxide to the inner fused silica or fused quartz arc tube 3 of the high intensity discharge headlight 1.

In the fused silica or fused quartz inner arc tube, the concentration of Neodymium Oxide is held to between 0.5 and 2.8 percent, since the incorporation of more than three percent by weight of Neodymium Oxide into fused silica or fused quartz is not possible.

In an alternate embodiment, as shown in FIG. 3, a high intensity discharge headlight 10 has generally concave inner reflector 12, which directs light from the fused silica or fused quartz inner arc tube through an outer lens envelope 14 in an outwardly expanding conical light beam B, which is likewise reflected from the vehicle headlight 10 and off of objects at night and in bad weather, back to the driver, with improved visual contrast from a reduction in the amount of yellow light, by the addition of Neodymium Oxide to the outer lens envelope 14 of the high intensity discharge headlight 10. The light beam is reflected back to the driver With a unique spectral energy distribution, which promotes night vision and visual acuity in daylight, by emphasizing the contrast-producing red and green light waves, and at the same time, reducing the discomfort producing yellow light of the visible light spectrum of the concentrated light beam from motor vehicles from the opposite direction.

The outer lens envelope of the headlight lamp 10 includes the element Neodymium, in the form of Neodymium Oxide, in an effective amount for reducing discomfort from yellow light and promoting illumination, from a concentration of 5% to a concentration not to exceed 30% within the lens glass. In the preferred embodiment for Neodymium Oxide, it may also be selected in a concentration from about 5% to a concentration of about 20 percent in the glass of the headlight lens.

The Neodymium Oxide is employed in a vehicular headlight for a vehicle, such as an automobile, an aircraft, a locomotive, a water craft and other land traversing vehicles, such as all terrain vehicles, buses, vans, or motorcycles.

In use, the lamp of the headlight of the present invention is for artificial illumination and has a spectral energy distribution signature bearing a reduction in yellow light, which is characterized as transmitted spectral energy in the wavelengths of light from about 565 nanometers to about 595 nanometers.

Preferably, the lamp constitutes a spectral energy distribution signature having a substantial reduction of up to 95% of the yellow light, namely light with transmitted spectral energy for wavelengths from about 565 to about 595 nanometers as compared to the transmitted spectral energy of a headlight lamp not containing Neodymium Oxide.

The present invention is used to improve vision under conditions of artificial illumination, for providing artificial illumination in a spectral energy distribution signature having a reduction of up to 95% of the yellow light, namely light with transmitted spectral energy for wavelengths from about 565 to about 595 nanometers, as compared with the transmitted spectral energy of a headlight lamp not containing Neodymium Oxide.

The present invention specifically includes the use of a headlight lamp for artificial illumination for a vehicle; it has an outer lens glass envelope of a suitable material such as a compound including the element Neodymium, wherein the Neodymium compound is Neodymium Oxide, or it has the Neodymium Oxide incorporated into the inner arc tube.

Specifically, to improve highway traffic safety at night in the absence of daylight, the present invention proposes improving vision under conditions of artificial illumination by providing automotive headlight illumination with a headlight lamp including glass having Neodymium Oxide, in a spectral energy distribution having a reduction of yellow light, such as light with up to 95% of the transmitted spectral energy for wavelengths from about 565 to about 595 nanometers removed from the spectrum, as compared with the transmitted spectral energy of a high intensity discharge headlight lamp not containing Neodymium Oxide.

Modifications may be made to the method used for making the device, the device itself as well as the process described for the color corrected high intensity motor vehicle headlight without departing from the spirit and scope of the invention as exemplified in the appended claims.

I claim:

1. A vehicular high intensity discharge headlight lamp for artificial illumination, comprising an inner arc tube generated light beam source, a generally concave inner reflector, an outer lens, said inner reflector being integral with said outer lens, said inner reflector and said lens comprising a bulb envelope for the transmission of said arc tube generated light beam reflected off of said generally concave inner reflector through said outer lens of said bulb envelope, and a means for reducing the amount of transmitted yellow light in the range of 565 to 595 nanometers by up to about 95% and promoting illumination, said means for reducing the amount of transmitted yellow light in the range of 565 to 595 nanometers and promoting illumination comprising said bulb envelope including glass material containing Neodymium in the range of 5.0–30% by weight as calculated in terms of Neodymium Oxide based on the total weight of the glass material.

2. The vehicular high intensity discharge headlight lamp as in claim 1 wherein the lamp is a vehicular headlight lamp for an automobile.

3. The vehicular high intensity discharge headlight lamp as in claim 1 wherein the lamp is a vehicular headlight lamp for a truck.

4. The vehicular high intensity discharge headlight lamp as in claim 1 wherein the lamp is a vehicular headlight lamp for a bus.

5. The vehicular high intensity discharge headlight lamp as in claim 1 wherein the lamp is a vehicular headlight lamp for a motorcycle.

6. The vehicular high intensity discharge headlight lamp as in claim 1 wherein the lamp is a vehicular headlight lamp for a locomotive.

7. The vehicular high intensity discharge headlight lamp as in claim 1 wherein the lamp is a vehicular headlight lamp for all terrain vehicles.

8. The vehicular high intensity discharge headlight lamp as in claim 1 wherein the lamp is a vehicular headlight lamp for a van.

9. A vehicular high intensity discharge headlight lamp for artificial illumination, comprising an inner arc tube generated light source, a generally concave inner reflector, and an outer transparent lens envelope for transmission of said arc tube generated light source reflected off of said generally concave inner reflector through said outer transparent lens envelope, and a means for reducing the amount of transmitted yellow light in the range of 565 to 595 nanometers and promoting illumination comprising said inner arc tube being suitable fused silica material including the element Neodymium in oxide form as Neodymium Oxide.

10. A vehicular high intensity discharge headlight lamp as in claim 9 wherein said inner arc tube comprises a fused silica material containing therein the compound Neodymium Oxide for reducing visual discomfort and visual disability, and promoting illumination from a concentration of about 0.5% to a concentration of about 3.0% within said inner arc tube.

11. The vehicular high intensity discharge headlight lamp as in claim 9 wherein the lamp is a vehicular headlight lamp for an automobile.

12. The vehicular high intensity discharge headlight lamp as in claim 9 wherein the lamp is a vehicular headlight lamp for a truck.

13. The vehicular high intensity discharge headlight lamp as in claim 9 wherein the lamp is a vehicular headlight lamp for a bus.

14. The vehicular high intensity discharge headlight lamp as in claim 9 wherein the lamp is a vehicular headlight lamp for a motorcycle.

15. The vehicular high intensity discharge headlight lamp as in claim 9 wherein the lamp is a vehicular headlight lamp for a locomotive.

16. The vehicular high intensity discharge headlight lamp as in claim 9 wherein the lamp is a vehicular headlight lamp for all terrain vehicles.

17. The vehicular high intensity discharge headlight lamp as in claim 9 wherein the lamp is a vehicular headlight lamp for a van.

18. A vehicular high intensity discharge headlight lamp for artificial illumination, comprising an inner arc tube generated light source, a generally concave inner reflector, and an outer transparent lens envelope for transmission of said arc tube generated light source reflected off of said generally concave inner reflector through said outer transparent lens envelope, and a means for reducing the amount of transmitted yellow light in the range of 565 to 595 nanometers and promoting illumination comprising said inner arc tube being suitable fused quartz material including the element Neodymium in oxide form as Neodymium Oxide.

19. A vehicular high intensity discharge headlight lamp as in claim 18 wherein said inner arc tube comprises a fused quartz material containing therein the compound Neodymium Oxide for reducing visual discomfort and visual disability, and promoting illumination from a concentration of about 0.5% to a concentration of about 3.0% within said inner arc tube.

20. The vehicular high intensity discharge headlight lamp as in claim 19 where the lamp is a vehicular headlight lamp for an automobile.

21. The vehicular high intensity discharge headlight lamp as in claim 19 where the lamp is a vehicular headlight lamp for a truck.

22. The vehicular high intensity discharge headlight lamp as in claim 19 where the lamp is a vehicular headlight lamp for a bus.

23. The vehicular high intensity discharge headlight lamp as in claim 19 where the lamp is a vehicular headlight lamp for a motorcycle.

24. The vehicular high intensity discharge headlight lamp as in claim 19 where the lamp is a vehicular headlight lamp for a locomotive.

25. The vehicular high intensity discharge headlight lamp as in claim 19 where the lamp is a vehicular headlight lamp for all terrain vehicles.

26. The vehicular high intensity discharge headlight lamp as in claim 19 where the lamp is a vehicular headlight lamp for a van.

* * * * *